United States Patent [19]

Tangorra et al.

[11] 4,315,562
[45] Feb. 16, 1982

[54] ENERGY ACCUMULATOR

[75] Inventors: Giorgio Tangorra; Lino Magnabosco, both of Milan, Italy

[73] Assignee: Industrie Pirelli S.p.A., Milan, Italy

[21] Appl. No.: 120,831

[22] Filed: Feb. 12, 1980

[30] Foreign Application Priority Data

Feb. 23, 1979 [IT] Italy ................................ 20449 A/79

[51] Int. Cl.³ .............................................. F03G 1/04
[52] U.S. Cl. ...................................... 185/37; 185/45; 267/73; 267/153
[58] Field of Search ................... 185/9, 10, 37, 39, 45; 267/69, 73, 74, 153

[56] References Cited

U.S. PATENT DOCUMENTS

| | | | |
|---|---|---|---|
| 131,631 | 9/1872 | Schumacher | 185/37 |
| 1,212,786 | 1/1917 | Magidson | 185/45 |
| 1,212,788 | 1/1917 | Magidson | 185/37 |
| 2,773,563 | 12/1956 | Bevis et al. | 185/39 |
| 3,126,070 | 3/1964 | Hayek | 185/37 |

FOREIGN PATENT DOCUMENTS

| | | | |
|---|---|---|---|
| 9461 | 2/1955 | Fed. Rep. of Germany | 185/37 |
| 866674 | 5/1941 | France | 185/37 |
| 748078 | 4/1956 | United Kingdom | 185/37 |

*Primary Examiner*—Allan D. Herrmann
*Attorney, Agent, or Firm*—Stevens, Davis, Miller & Mosher

[57] ABSTRACT

A device for storing and later releasing mechanical energy has an elongate body, preferably cylindrical, at least one elastic strip or band wound helicoidally about the body and fastened thereto at each end thereof. A rigid rod extends longitudinally through and supports the body. The strips are wound about the body by rotating one end of the body on the rod. The strips of elastic material are subjected only to tensile stress and can be greatly deformed to accumulate a large amount of energy. The dimensions of the device are relatively small and need not be varied to accumulate a large amount of energy. The device is useful for starting an internal combustion engine, a rechargeable element as a substitute for a motor or as an accumulator of braking energy of a motor vehicle.

3 Claims, 4 Drawing Figures

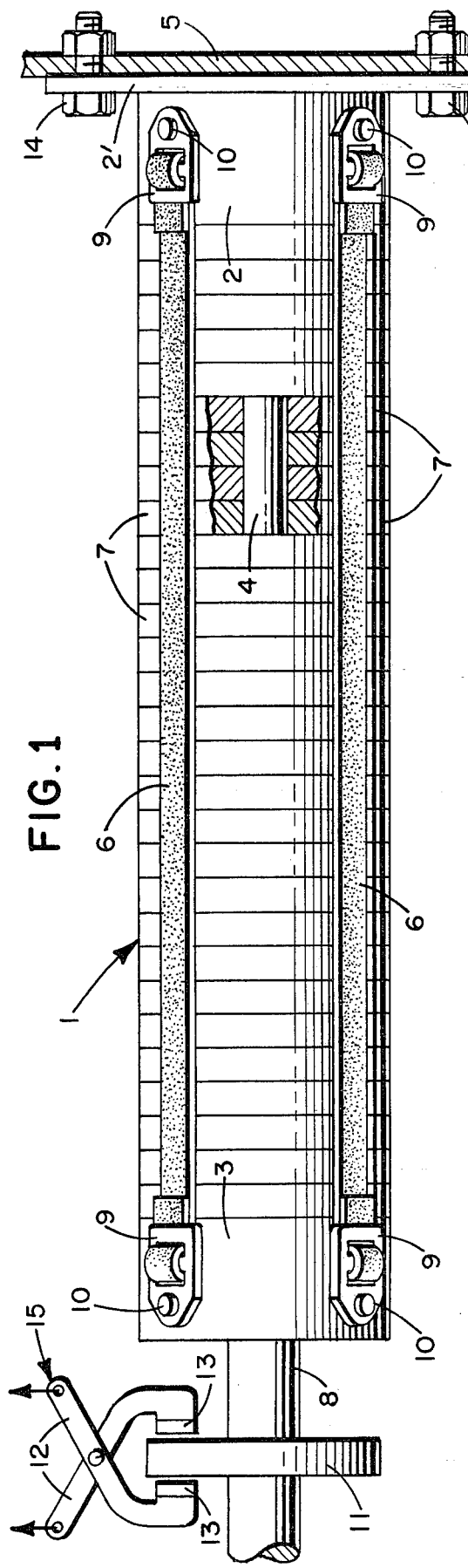
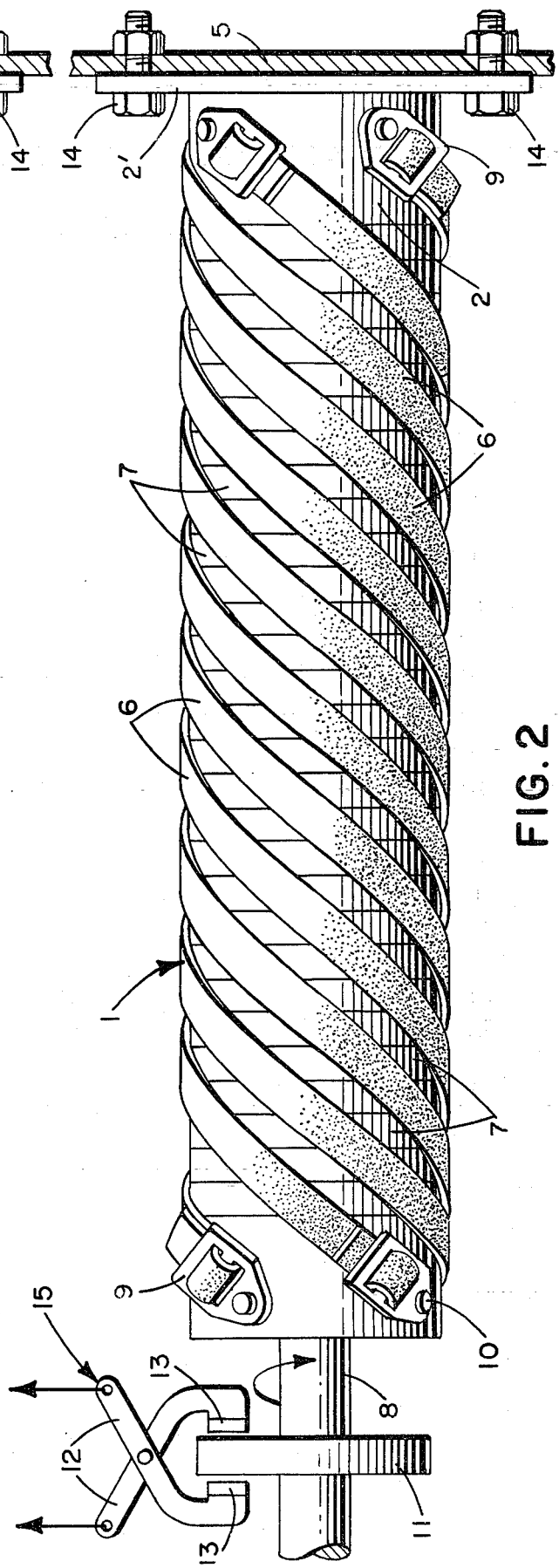

ENERGY ACCUMULATOR

This invention relates generally to an energy accumulator, and in particular to a mechanical energy accumulator adapted for efficiently restoring the stored energy.

Mechanical energy accumulators are known which, when deformed, store the energy utilized for deforming them and to then return this energy at the desired moment upon the release of the deformation.

These "known" energy accumulators vary a large amount in their overall dimensions.

In fact, the quantity of stored energy is proportional to the deformation itself. For this reason, to store large quantities of energy, large deformations (depending on the material used) are necessary, with consequent large variations in the overall dimensions of the accumulators. One type of energy accumulator that functions in this way, is the "spring".

An object of the present invention is to provide an energy accumulator which can store large quantities of energy while being, at the same time, lightweight and small dimensioned. Other objects will become apparent from the following description with reference to the accompanying drawing wherein FIG. 1 illustrates in elevation, partially in section, one embodiment of an energy accumulator provided by the invention in a discharged state;

FIG. 2 illustrates the embodiment of FIG. 1 in elevation in its loading state.

Figure 3:
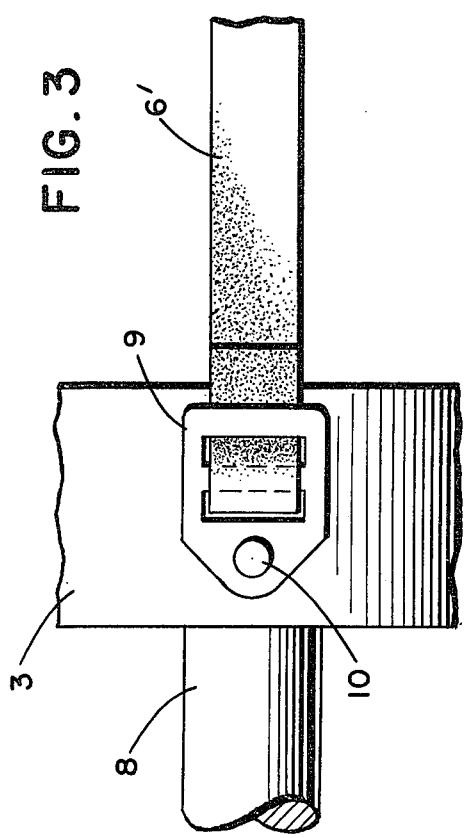
FIG. 3 is an enlarged fragmentary elevation of one end of the energy accumulator of the invention.

The foregoing objects and others are accomplished in accordance with the invention, generally speaking, by providing a device which releasably accumulates energy. The device has an elongate body and elastic members disposed along one generatrix of the elongate body when the energy accumulator is in its discharged state and means at least at one end of the elongate body for helicoidally winding the elastic members around the elongate body. One embodiment of the invention has an elongate cylindrical body, elastic members disposed according to the generatrices of the accumulator and, preferably, has a means for defining a surface that is equidistant from the axis of the elongate body on which the elastic members rest.

Referring now to FIGS. 1 and 2, an embodiment of the energy accumulator 1 of the invention has an elongate body with end portions or extremities 2 and 3. Extremities 2 and 3 are maintained spaced from each other by rigid steel bar 4 forming the core of the body disposed along the longitudinal axis thereof. Bar 4 is firmly connected to end portion 2 which is a metallic sleeve. The sleeve is connected by a flange 2' with bolts to a support member 5 fixed externally of the energy accumulator. The axis of the circumferentially spaced bolts is shown with longitudinally spaced dot-dash lines in FIG. 2.

The opposite end portion 3 of the elongate body, also a metallic sleeve, is mounted to idle on bar 4 by means of an interposed thrust bearing.

End portion 3 is adapted to wind the elastic strips 6 around the elongate body along at least one generatrix thereof.

In an alternate embodiment of an energy accumulator (not illustrated), bar 4 is articulated and is a flexible bar of invariable length and both of the end portions are connected to external supports for the energy accumulator with at least one of the end portions being capable of rotating freely with respect to its support. The supports are maintained spaced a fixed distance apart. Moreover, in relatively short energy accumulators, metallic bar 4 may be omitted.

Strips 6 are an elasomeric material and are connected to end portions 2 and 3 by a hinged device which will be described later. Said strips 6 have a rectangular shape in cross-section, although they may be of whatsoever shape as for example circular or elliptical. The lengths of strips 6 before mounting between portions 2 and 3 are less than the length of their path between end portions 2 and 3 so the elastomeric material is stretched and under tension because of the stretching. Strips 6 are preferably stretched not less than 10% of their unstretched lengths.

In other embodiments of the invention, spiral springs or elastomeric tubes coaxial with the elongate body or other recoilable elements adapted to be placed under tension are substituted for elastomeric strips 6 mounted under tension between end portions 2 and 3. Elastomeric strips 6 are rubber or synthetic elastomer having a lower hysterises and excellent resistance to tractive fatigue. Examples of appropriate materials for said elastomeric strips are natural rubber with or without carbon black, neoprene rubber with or without carbon black, cis-polybutadiene rubber or polyurethane rubber.

Elastomeric strips 6 rest on a surface which is equidistant from the axis of the elongate body 1 defined by a plurality of thin washers 7 mounted to idle side by side on bar 4 with their adjacent surfaces contacting each other (FIG. 1).

Adjacent washers 7 are preferably made of different materials so as to reduce the friction which is created on the flat contacting surfaces between washers 7.

The material suitable for the purpose can, solely by way of example, consist of anti-friction metals, or suitable plastic materials.

Alternatively, the flat contacting sides of the washers 7 can be covered with layers of a suitable material such as, for example, polytetrafluoroethylene.

For reducing the friction between adjacent washers 7, and between the washer 7 and the bar 4, steel spheres can be mounted in a suitable way, so as to substitute a "rolling" friction for the "sliding" friction.

Moreover, when a bar 4 is not provided, the washers 7 will be kept in position by the strips 6. As previously stated, the extremity portion 3, constituted by a metallic sleeve, is a particular embodiment of the means for winding the strips 6 of elastomeric material around the surface of the elongate body 1 formed by the washers 7. For winding the strips 6 around the surface formed by the edges of washers 7, the extremity portion 3 is connected to a shaft 8. Shaft 8 can act, thanks, for example, to an opportune mechanical gear (not shown in the Figures), either as a motor-shaft or drive shaft when the energy accumulator is loaded; or else, as a utilizer-shaft when the accumulator returns the energy accumulated during a previous loading phase.

On shaft 8, a braking device can act, for blocking the energy accumulator for keeping it from un-loading. Said braking device comprises a disk 11, integral with shaft 8 and pincers 12, provided with pads 13. Said pads 13 are pressed against both faces of disk 11 by a mechanism (not shown) which pulls on the extremities of pincers 12 (see arrows of FIG. 1) thereby obtaining the arrest of disk 11 and consequently of shaft 8.

Figure 4:
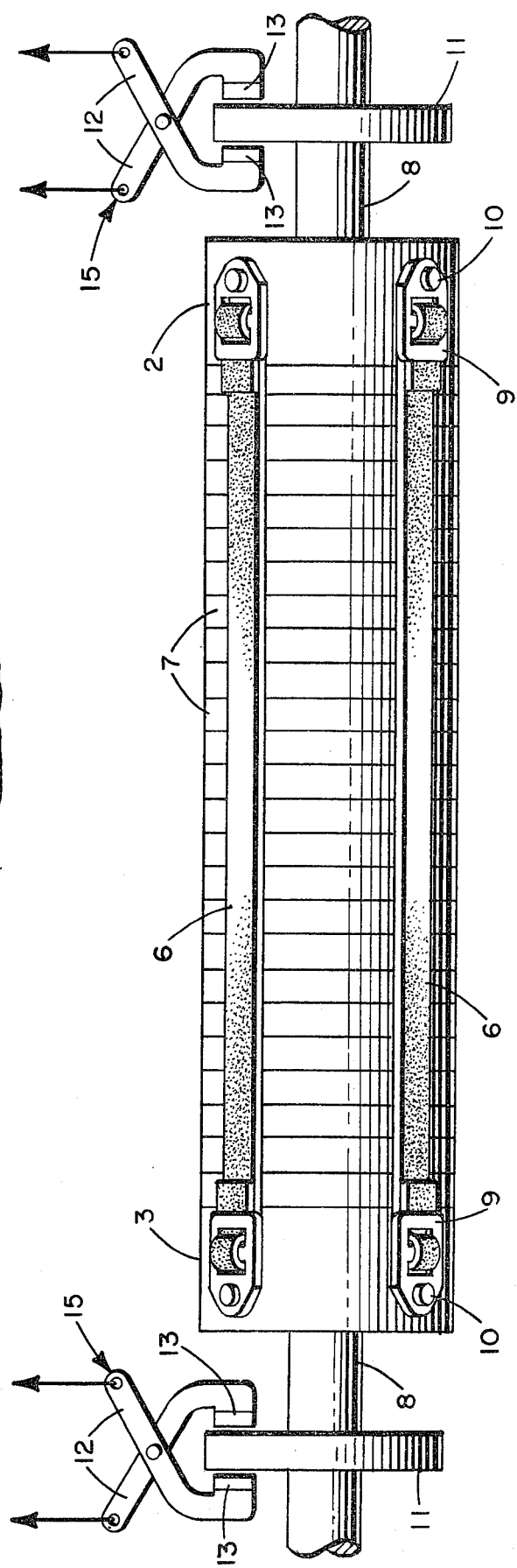
FIG. 4 illustrates a further embodiment in elevation in a discharged state.

In another alternative embodiment of the energy accumulator, according to the present invention, shown in FIG. 4 in the discharged state, two shafts are provided with the energy accumulator being otherwise the same as the one first described and therefore like numerals denoting the same parts also in FIG. 4, the sole difference being that there are two shafts 8 and 8' respectively (preferably disposed along the same axis), one connected to extremity portion 2 and the other to extremity portion 3, of the elongate body 1, so that one shaft can carry out the function of the motor-shaft, and the other, the function of the utilizer-shaft. Each of these shafts may also be capable of carrying out both these functions, at different times, depending upon the circumstances or the application of the device. Both shafts are shown provided with a braking device of the type previously described although one or both of said braking devices may not be necessary for some particular employments. In FIG. 3, a preferred embodiment of the hinged device for connecting the elastic means to the extremity portions 2 and 3 is shown.

In FIG. 3, one end of a strip 6' of elastomeric material passes, alternately, above and below the opening present at one end of a buckle 9 that is hinged at its opposite end to a pin 10 on the external surface of the extremity 3.

A similar hinged device is situated on another pin 10 present on the extremity portion 2, and to the second hinged device is connected the opposite end of strip 6' of elastomeric material. In this way, both ends of the strip 6' of elastomeric material, e.g. rubber, can rotate with respect to their at rest positions, thus permitting the strip to substantially undergo a tensile stress.

Obviously, the embodiment just described of the hinged device for connecting strips 6' to the end portions, is not to be taken in a limited sense, because other conventional devices having a hinged connection between the strips and the extremity portions which allow the strips to rotate around their rest position and thereby be subjected substantially only to tensile stress can be substituted therefor.

The operation of an energy accumulator provided by the present invention, is as follows:

At the start of the loading phase of the energy accumulator, the accumulator is in the position represented in FIG. 1.

The mechanical energy is transferred to the accumulator by means of shaft 8 which rotates extremity portion 3, while the extremity portion 2 is blocked, and cannot rotate.

As a consequence, the strips 6 of elastomeric material that are stretched between the two extremity portions, are wound around the elongate body 1.

In order to be wound, the strips must be stretched and, hence, the energy which is transferred through the shaft 8, is stored.

Moreover, strips 6 are in contact with peripheral surfaces of the washers 7, and during their winding movement around the elongate body, they pull along with them washers 7 and cause them also to rotate around the bar 4.

In this way almost total elimination of any sliding movements between strips 6 and washers 7 is obtained, with the exception of the very small sliding movement due to the relative rotation between strips 6 and washers 7.

The loading phase of the energy accumulator continues until the various strips 6 of elastomeric material have been wound and stretched, in such a way as to cover the entire surface of the elongate body 1 provided by said washers 7, i.e., until the sides of the two adjacent strips 6 come into contact.

At this point, the maximum load is reached for the energy accumulator, and the rotation of the shaft 8 can be interrupted and shaft 8 blocked by means of a brake which also blocks extremity 3, and prevents any unloading of the accumulator.

During the unloading phase, the shaft 8 is connected to the utilizer shaft, and the brake which blocks shaft 8 is released.

The accumulator thus begins to return the energy stored during the stretching of the strips 6.

The energy return will continue until the strips 6 return to their original position, coincident with the generatrices of the elongate body 1, or until the shaft 8 is again blocked by the brake.

It can be seen thus, how, with the energy accumulator according to the present invention, the objects of the invention are achieved.

In particular, because of the method adopted for the accumulators of the present invention, it is possible to store a large amount of energy while maintaining the overall dimensions constant and with reduced weight for the accumulator.

In fact, since the strips of elastomeric material are subjected only to tensile stress and are wound around a cylindrical nucleus, these strips can be greatly deformed and, as a consequence, can accumulate a great quantity of energy without varying the dimensions of the accumulator.

Moreover, the particular structure adopted for the accumulator of the present invention, allows construction of very lightweight accumulators, which are capable of accumulating large amounts of energy while maintaining very small overall dimensions.

Moreover, because of the employment of the hinged devices for connecting the strips of elastomeric material to the extremity portions 2 and 3 the advantage that the strips are subjected substantially only to tensile stresses and consequently, are neither subjected to torsional stresses, nor to shear stresses is achieved. For this reason, the total state of stresses present in the "stretched" strips, is rendered as low as possible, considering the same quantity of stored energy, thus, obtaining good results as far as the service-life of the strips is concerned.

Furthermore, the hysteresis losses in the rubber or other elastomer, and also those losses due to various sliding movements, are very much reduced. The former are reduced because of an appropriate choice of suitable elastomeric compounds for the strips; the latter are reduced, thanks to the washers 7 which, in following point by point, the strips themselves during their winding motion, do not allow any sliding movement, but only permit small relative rotations owing to the increase in the inclination of the strips with respect to the generatrices of the elongate body as the accumulated energy increases.

All of these above-mentioned characteristics, render the accumulators (according to the present invention) suitable for a plurality of uses, for example, as starters for internal combustion engines; as re-chargeable elements to be used as substitutes for motors; or as accumulators for the braking energy of various types of vehicles, and the like.

Furthermore, it must be noted that since the number of elastomeric material strips to be applied to an energy accumulator is proportional to the circumference of the cylindrical surface of the elongate body on which these strips lie, to the axial length of the accumulators, as well as to the maximum "stretch" supported by the elastomeric material of the strips, any technician of the field can determine the dimensions and the number of strips, required for storing the maximum quantity of energy and to the mechanical torque desired. As a result even with a small increase in the diameter of the elongate body and, consequently, with an increase in the circumference of the elongate body, the number of elastomeric strips which can be applied to the elongate body increases, while maintaining the same maximum elongation for the strips.

Besides this, since the torque provided by the accumulator, is proportional to the distance between the strips and the axis of the accumulator, any increase in the diameter of the accumulator also causes an increase of the torque produced by the accumulator.

From this fact, it can be deduced that even small increases in the overall dimensions of the energy accumulator (according to the present invention), permit great increases in the twisting moment and in the stored energy of the energy accumulator.

Although a particular embodiment of an energy accumulator according to the present invention, has been described and illustrated, it is to be understood that the present invention includes within its ambit any other alternative embodiments that are accessible to a technician of the field except as the invention is limited by the claims.

What is claimed is:

1. A device comprising deformable members for storing mechanical energy developed as the members are stretched and for releasing the stored energy as the members recover from the stretching, said device comprising a substantially cylindrical rigid body member having opposite ends, a rigid metallic bar extending longitudinally through the body member, at least one rubber strip attached by hinge means to each of said opposite ends, wound helicoidally about the body member and spanning the space between the points of attachment to said body member, one of said opposite ends of the said body member being rotatably mounted on said bar to wind the said rubber strip about the body member under tension.

2. An energy accumulator comprising an elongate body member, at least one pretensioned elastomeric strip disposed along a generatrix of said elongate body member when the accumulator is discharged and means, at least at one end of said elongate body member for helicoidally disposing said pre-tensioned elastomeric strip around the elongate body member, thereby maintaining during operation said elastomeric strip subjected substantially only to tensile stresses, a rigid bar extending through said body member, said elongate body member comprising a plurality of annular elements mounted idly on the rigid bar in contact with each other and free to rotate with respect to each other, defining a supporting surface equidistant from the axis of the elongate body member whereon said elastomeric strip rests, said elastomeric strip being connected to aid means for helicoidally disposing said strip around the elongate body member through a hinged connection.

3. An energy accumulator according to claim 1 wherein said means for helicoidally disposing said pretensioned elastomeric strip around the elongate body member comprise a rigid sleeve at least at one extremity of the elongate body member mounted on said rigid bar and rotatable with respect to the rest of the elongate body member, the outer surface of said sleeve forming a cylindrical extension of said supporting surface on which the elastomeric strip rests, said hinged connection being disposed on the surface of said sleeve.

* * * * *